April 17, 1951  S. E. HARRIS  2,549,308
FLUID TORQUE CONVERTER
Filed Aug. 24, 1945  3 Sheets-Sheet 1
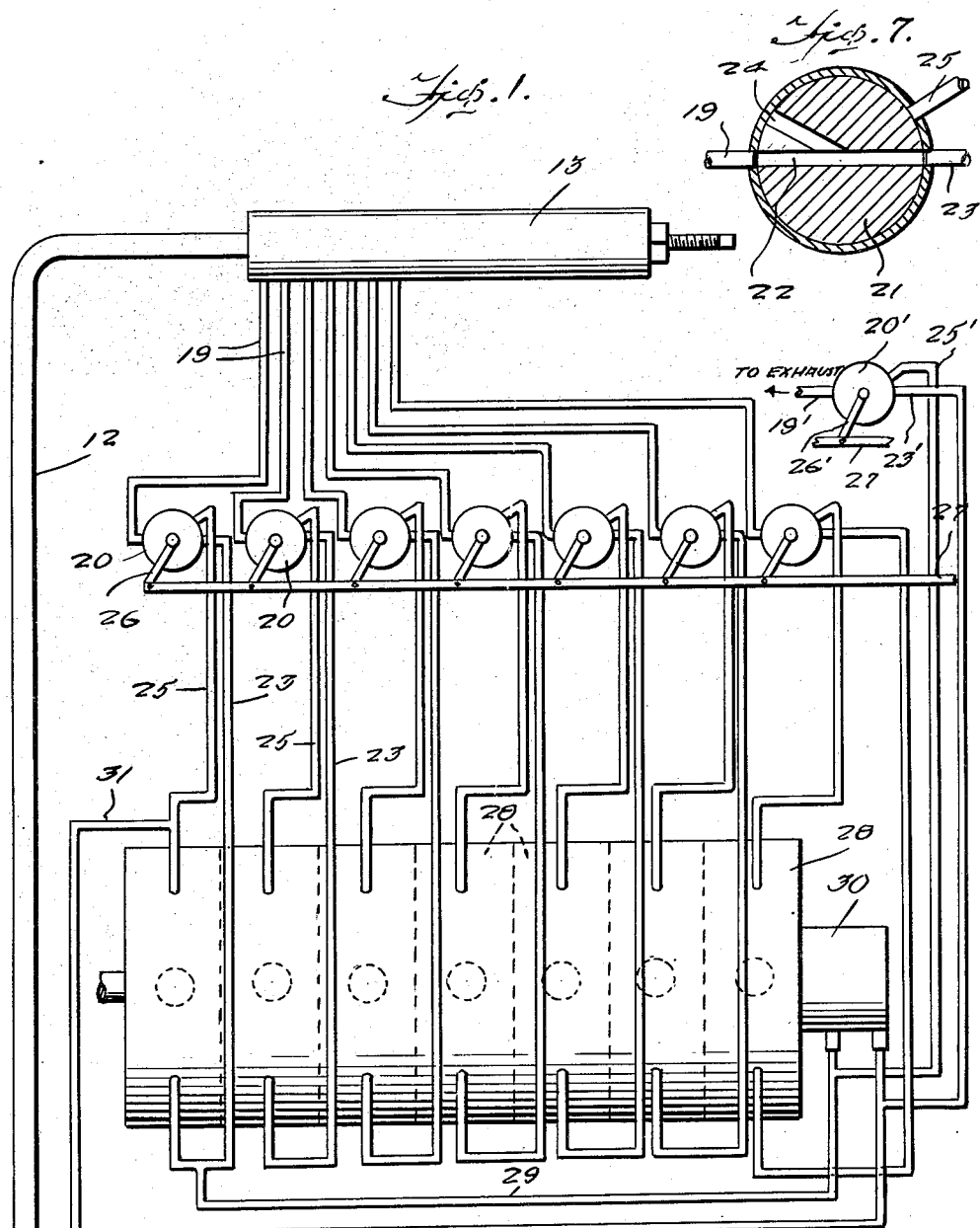
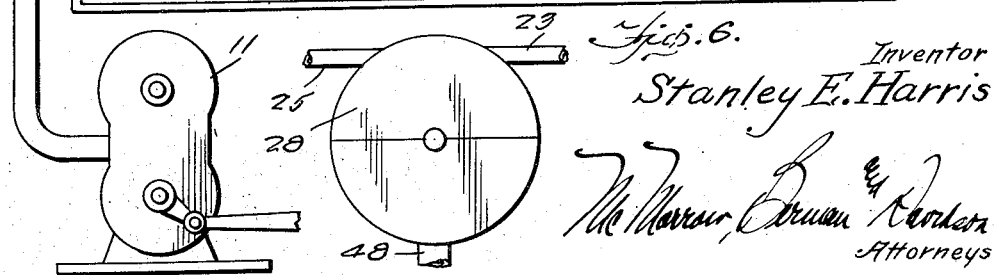
Inventor
Stanley E. Harris
Attorneys April 17, 1951  S. E. HARRIS  2,549,308
FLUID TORQUE CONVERTER
Filed Aug. 24, 1945  3 Sheets-Sheet 2

Inventor
Stanley E. Harris
Attorneys

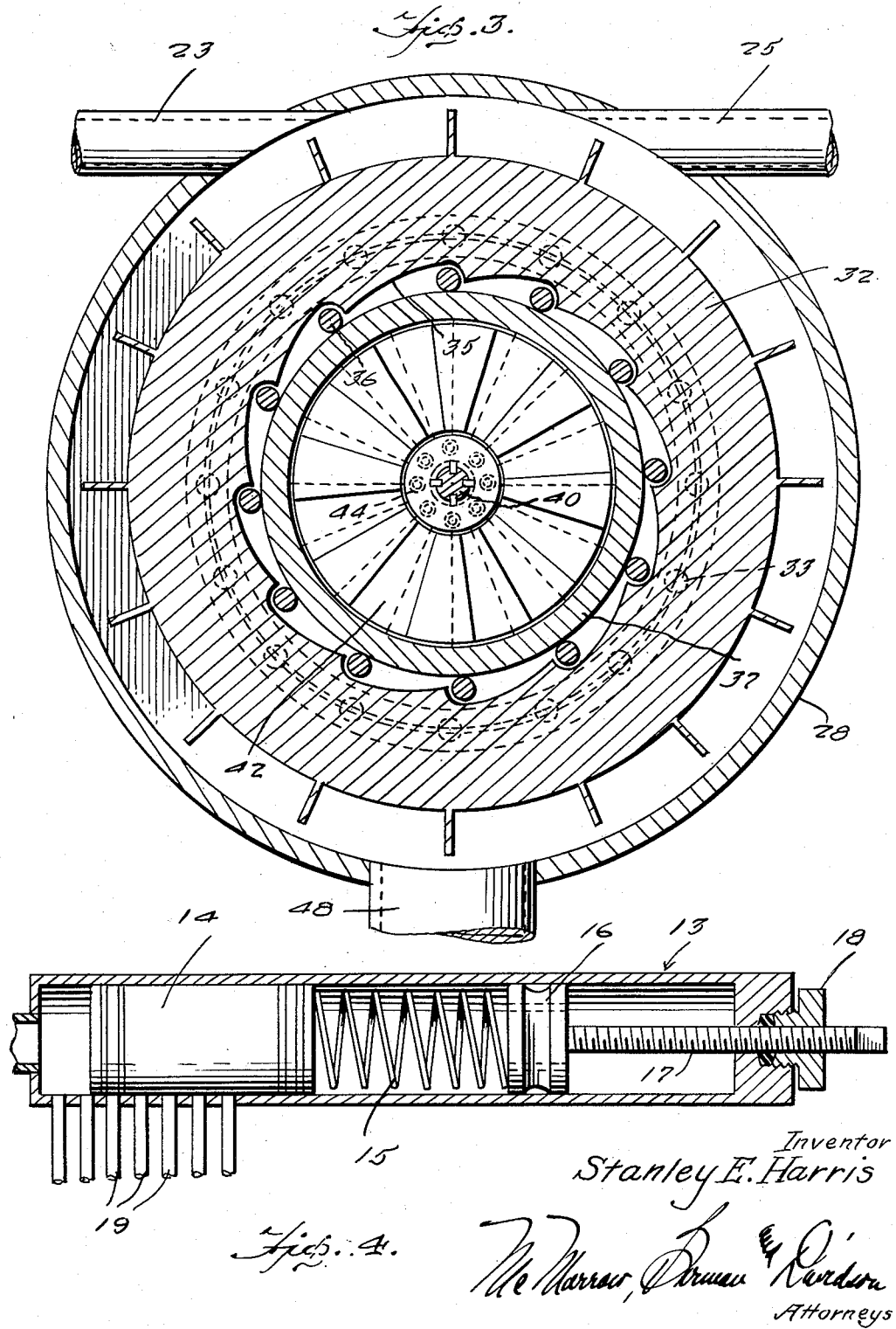

Patented Apr. 17, 1951

2,549,308

UNITED STATES PATENT OFFICE 2,549,308

FLUID TORQUE CONVERTER

Stanley E. Harris, Waterloo, Iowa

Application August 24, 1945, Serial No. 612,487

7 Claims. (Cl. 192—.098)

1

This invention relates to hydraulic transmission systems, and more particularly to automatic torque regulating means for hydraulic transmission systems.

A main object of the invention is to provide a novel and improved torque control arrangement for a turbotransmission for vehicles and the like, wherein the amount of torque developed is automatically regulated in accordance with the power required in accelerating up to the limit available at the prime mover.

A further object of the invention is to provide an improved torque conversion system in a fluid transmission structure including reversing means for reversing the direction of the driven shaft.

A still further object of the invention is to provide an improved torque conversion system having a plurality of fluid motor units controlled by an automatic selector valve for activating a required number of motor units to develop the torque required at the driving shaft, said selector valve functioning responsive to the back pressure developed in the fluid circuit of the motor units.

Further objects and advantages of the invention will appear from the following description and claims and the accompanying drawings, wherein:

Figure 1 is a schematic view of a torque converting system in accordance with the present invention.

Figure 3 is a transverse vertical cross-sectional view of a motor unit shown in Figure 2.

Figure 4 is a longitudinal vertical cross-sectional view of the automatic motor activating valve employed in the system of Figure 1.

Figure 6 is a front elevational view of a fluid motor unit employed in the system of Figure 1.

Figure 7 is a cross-sectional detail view of a control valve unit employed in the system of Figure 1.

Figure 2:
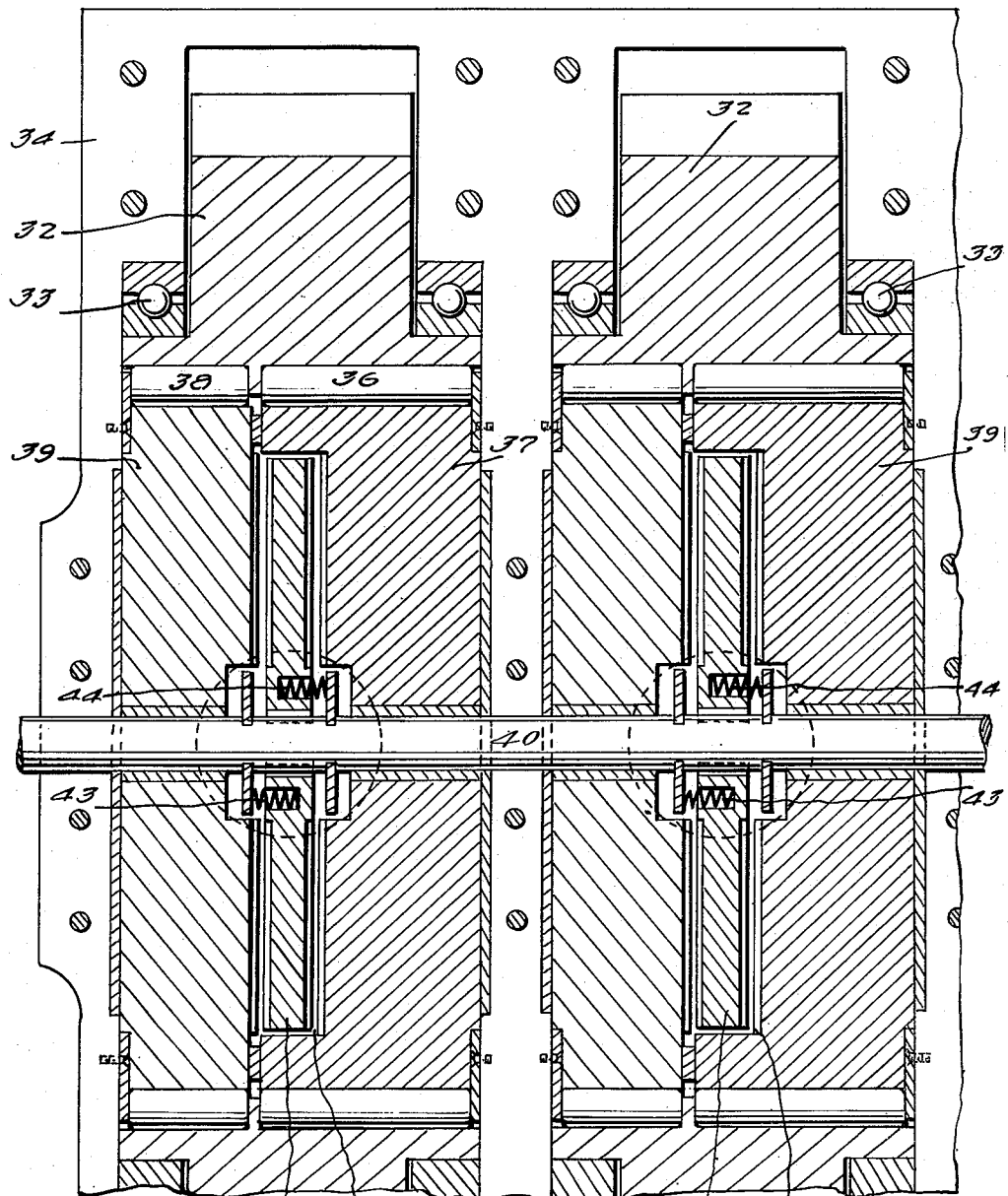
Figure 2 is a longitudinal vertical cross-sectional view of a pair of fluid motor units employed in the system of Figure 1.
Figure 5:
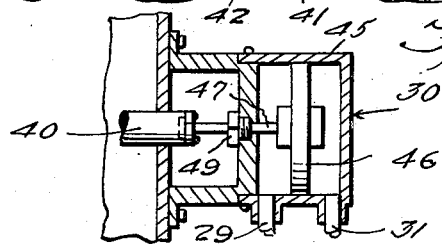
Figure 5 is a detail view of the reversing device employed with the fluid motor units of the system of Figure 1.

Referring to the drawings, the torque conversion system comprises an engine-driven pump 11, which may be driven from the crankshaft of an internal combustion engine or other suitable prime mover, connected by a conduit 12 to a selector valve 13. Selector valve 13 consists of a cylinder having slidably positioned therein a piston member 14 which is biased to a forward position by a coil spring 15 positioned between

2 the rear end of piston 14 and an adjustable abutment member 16, having a threaded shank 17 threadedly engaged with the rear end wall of valve 13 for forward or rearward adjustment of member 16, shank 17 being locked in adjusted position by a gland nut 18. The forward cylindrical wall portion of valve 13 has a series of exit ports connected by conduits 19 to each of a series of control valves 20. Each control valve 20 comprises a cylindrical housing, containing a rotatable cylindrical block 21 having a diametrical passage 22 formed therein adapted to connect conduit 19 with a first motor intake conduit 23, and a radial passage 24 communicating with passage 22 and adapted to connect conduit 19 to a second motor intake conduit 25 when block 21 has been rotated from the normal position shown in Figure 7 through an angle equal to the angle between passages 22 and 24. An operating lever 26 is provided for each block 21, the levers 26 being linked to a bar member 27 so that all the control valves 20 may be simultaneously operated thereby. Each set of conduits 23 and 25 is connected to one of a series of turbomotor units 28, the conduits 23 being for the admission of fluid for forward actuation of the motor units and the conduits 25 being for the admission of fluid for reverse actuation of the units. A conduit 29 extends from the forward intake conduit 23 of the first motor unit to a clutch actuating device 30 and a similar conduit 31 extends from the reverse intake conduit 25 to said device.

Each motor unit 28 comprises an impeller wheel 32 rotatably supported on ball bearings 33 in the motor housing 34. Wheel 32 has a body portion which is generally annular in shape and is formed on its inner periphery with two sets of tapering recesses, as shown in Figure 3, each of said recesses loosely receiving a roller member. The recesses 35 shown in Figure 3 cooperate with roller members 36 to provide an over-running one-way clutch for coupling with a driven drum 37 for forward actuation of impeller wheel 32. Reversely formed recesses are likewise provided for loosely receiving roller members 38 to provide an over-running one-way clutch for coupling with a driven drum 39 for reverse actuation of impeller wheel 32. Drums 37 and 39 are freely rotatably mounted on a central main shaft 40 extending through all the motor units. Drum 37 is formed with an annular recess 41 in which is positioned a friction clutch element or disc member 42. Member 42 is keyed to shaft 40 for longitudinal movement with respect thereto and is biased to a central position between the adjacent facing surfaces of drum members 37 and 39 by spring members 43 and 44 which bear between disc member 42 and appropriate bearing plates carried by shaft 40. The opposing faces of disc member 42 and the drum members are radially recessed to provide clutching surfaces. These surfaces are respectively engaged when the shaft 40 is moved longitudinally either to the right or to the left, as shown in Figure 2, with respect to the drum members by actuating device 30.

Actuating device 30 comprises a cylinder 45 containing a piston member 46 secured by a rod 47 passing through a fluid-tight gland 49 to the end of shaft 40, the connection of rod 47 to shaft 40 allowing relative rotation therebetween. When fluid is admitted from conduit 29 into cylinder 45, piston member 46 moves shaft 40 to the right, engaging disc 42 with drum 37 for forward actuation of shaft 40, and when fluid is admitted through conduit 31 into cylinder 45, piston 46 moves shaft 40 to the left to engage disc 42 with drum 39 for reverse actuation of shaft 40.

An exhaust valve 20' is provided for exhausting actuating device 30, said exhaust valve being identical in structure with the control valves 20 but having its left end conduit 19' connected to the fluid storage tank of the system and having its first right end conduit 23' connected to conduit 31 and its second right end conduit 25' connected to conduit 29. An actuating bar 26' connects the valve to the aforementioned bar member 27 for simultaneous actuation of valve 20' with valves 20. As can be readily seen from Figures 1 and 7, when valves 20 are set for forward actuation, as in Figure 1, conduit 31 is vented to exhaust by valve 20'. Conversely, when valves 20 are set for reverse actuation, conduit 29 is vented to exhaust by valve 20'.

An exhaust passage 48 is provided in the motor housing for return of the fluid to the fluid storage tank of the system for recirculation by pump 11.

Pump 11 has provided therein a small bypass passage so that no fluid is circulated in the torque conversion system when the pump engine is idling. When the system is loaded, the engine is accelerated and pressure is developed in conduit 12 which forces back piston 14 against the pressure of spring 15 and allows fluid to enter those conduits 19 whose ports are uncovered by piston 14. The fluid passes through valves 20 and into the motor units 28, the clutch-operating device 30 having been automatically actuated by the fluid pressure to engage clutch disc 42 with either drum 37 or 39, depending on the setting of control valves 20. With the further acceleration of the engine, the pressure in the conduit 12 is increased, causing the piston 14 to be moved further to the rear, uncovering additional conduits 19 and activating additional motor units 28. As the number of motor units 28 which are activated increases, the speed of rotation of shaft 40 diminishes with respect to the speed of the prime mover shaft until a steady stated condition is reached.

While a specific embodiment of a torque conversion system has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. In a torque conversion system for a prime mover, a shaft, a plurality of fluid motors on said shaft, means for admitting fluid under pressure to said motors, clutch means associated with each of said motors and with said shaft, said clutch means being formed and arranged for at times operatively connecting the motors to said shaft, and means actuating said clutch means responsive to the admission of fluid to the motors for coupling the latter to the shaft.

2. In a torque conversion system for a prime mover, a shaft, a plurality of fluid motors on said shaft, means for admitting fluid under pressure to said motors, reversing means for the motors including clutch elements associated with the respective motors and with said shaft and being formed and arranged for at times operatively connecting the motors to said shaft, and means actuating said reversing means responsive to the admission of fluid to the motors for coupling the latter to the shaft.

3. In a torque conversion system for a prime mover, a shaft, a plurality of fluid motors on said shaft, means for admitting fluid under pressure to said motors, each of said motors comprising a drum member carried by said shaft, an impeller wheel arranged in surrounding relation with respect to said drum member, and a one-way clutch arranged for coupling said drum member and impeller wheel together, clutch means associated with each of the motors and with said shaft, said clutch means being formed and arranged for at times operatively connecting the motors to said shaft, and means actuating said clutch means responsive to the admission of fluid to the motors for connecting the motors to said shaft.

4. In a torque conversion system for a prime mover, a shaft, a plurality of fluid motors on said shaft, means for admitting fluid under pressure to said motors, each of said motors comprising a drum member carried by said shaft, an impeller wheel arranged in surrounding relation with respect to said drum member, and a one-way clutch arranged for coupling said drum member and impeller wheel together, clutch means associated with each of the drum members and with said shaft, said clutch means being formed and arranged for at times operatively connecting the drum members to said shaft, and means actuating said clutch means responsive to the admission of fluid to the motors for connecting the drum members to said shaft.

5. In a torque conversion system for a prime mover, a shaft, a plurality of fluid motors on said shaft, means for admitting fluid under pressure to said motors, each of said motors comprising an impeller wheel, a drum member on said shaft adapted to be coupled to said impeller wheel, and clutch means operatively connected to said shaft and formed and arranged to connect the drum member to said shaft at times, and means for operating said clutch means responsive to the admission of fluid to the motors.

6. In a torque conversion system for a prime mover, a shaft, a plurality of fluid motors on said shaft, means for admitting fluid under pressure to said motors, each of said motors comprising a pair of drum members arranged in juxtaposed relation with respect to each other and carried by said shaft, an impeller wheel concentrically mounted upon said drum members, a one-way clutch arranged to couple one of said pair of drum members to the wheel, a second one-way clutch arranged to couple the other of said pair of drum members to said wheel, and a common friction clutch element associated with said pair of drum members and carried by said shaft, said clutch element being formed and arranged to couple one or the other of said drum members to the shaft.

7. In a torque conversion system for a prime mover, a shaft, a plurality of fluid motors on said shaft, means for admitting fluid under pressure to said motors, each of said motors comprising a pair of drum members arranged in juxtaposed relation with respect to each other and carried by said shaft, an impeller wheel concentrically mounted upon said drum members, a one-way clutch arranged to couple one of said pair of drum members to the wheel, a second one-way clutch arranged to couple the other of said pair of drum members to said wheel, a common friction clutch element associated with said pair of drum members and carried by said shaft, said clutch element being formed and arranged to couple one or the other of said drum members to the shaft, and means for actuating the clutch elements responsive to the admission of fluid to the motors.

STANLEY E. HARRIS.

REFERENCES CITED

The following references are of record in the file of this patent:

UNITED STATES PATENTS

| Number | Name | Date |
| --- | --- | --- |
| 800,684 | Schneider | Oct. 3, 1905 |
| 1,799,113 | Miedbrodt | Mar. 31, 1931 |
| 1,953,458 | Bauer et al. | Apr. 3, 1934 |
| 2,019,745 | Swennes | Nov. 5, 1935 |
| 2,228,700 | Hamner | Jan. 14, 1941 |
| 2,359,267 | Horowitz | Sept. 26, 1944 |
| 2,370,526 | Doran | Feb. 27, 1945 |

OTHER REFERENCES

"The American Inventor," April 1906, vol. 15, No. 4, page 101.